(12) United States Patent
Yamaguchi et al.

(10) Patent No.: US 7,764,039 B2
(45) Date of Patent: Jul. 27, 2010

(54) NUMERICAL CONTROLLER

(75) Inventors: Takehiro Yamaguchi, Yamanashi (JP);
Tetsuo Hishikawa, Yamanashi (JP);
Yasushi Onishi, Fujiyoshida (JP);
Kentaro Fujibayashi, Musashino (JP)

(73) Assignee: Fanuc Ltd, Yamanashi (JP)

( * ) Notice: Subject to any disclaimer, the term of this patent is extended or adjusted under 35 U.S.C. 154(b) by 328 days.

(21) Appl. No.: 11/826,972

(22) Filed: Jul. 19, 2007

(65) Prior Publication Data
US 2008/0024083 A1 Jan. 31, 2008

(30) Foreign Application Priority Data
Jul. 25, 2006 (JP) .............................. 2006-202306

(51) Int. Cl.
*G05B 19/18* (2006.01)

(52) U.S. Cl. ................. 318/569; 318/567; 318/560

(58) Field of Classification Search ................. 318/569, 318/567, 560
See application file for complete search history.

(56) References Cited

U.S. PATENT DOCUMENTS

| 4,513,366 | A | * | 4/1985 | Munekata et al. ........... 700/178 |
| 4,758,961 | A | * | 7/1988 | Uemura et al. .............. 700/160 |
| 5,150,305 | A | * | 9/1992 | Sekikawa .................... 700/184 |
| 5,339,015 | A | * | 8/1994 | Hanaki et al. ............... 318/600 |
| 5,751,584 | A | * | 5/1998 | Yuasa et al. ................. 700/178 |
| 6,278,076 | B1 | | 8/2001 | Gake |
| 6,754,555 | B2 | * | 6/2004 | Yamato ....................... 700/178 |
| 6,856,853 | B2 | * | 2/2005 | Takahashi et al. ........... 700/178 |
| 2005/0102054 | A1 | | 5/2005 | Dolansky |
| 2006/0052901 | A1 | | 3/2006 | Nihei et al. |

FOREIGN PATENT DOCUMENTS

| CN | 1743148 | 3/2006 |
| DE | 103 52 815 | 6/2005 |
| JP | 2895316 | 3/1994 |
| JP | 8-152908 | 6/1996 |
| JP | 11-170117 | 6/1999 |
| JP | 2005-092654 | 4/2005 |

OTHER PUBLICATIONS

Extended European Search Report issued in corresponding European Patent Application No. 07112050.5, on Jan. 17, 2008.
Notice of Reason for Rejection for corresponding Japanese application 2006-202306 mailed Jun. 3, 2008.
Chinese Office Action for corresponding Chinese Office Action 2007101390777; issued Oct. 24, 2008.

* cited by examiner

*Primary Examiner*—Bentsu Ro
*Assistant Examiner*—David S Luo
(74) *Attorney, Agent, or Firm*—Staas & Halsey LLP

(57) ABSTRACT

A numerical controller is capable of foreseeing the occurrence of interference during operation of a machine and securely preventing the interference. An advanced position calculating section determines advanced time for the next interference check, based on an end time point of an interference check by an interference checking device and the sum of a time required for the interference check, a time required for communication, a time required for decelerating and stopping a movable part, and a predetermined float. If an interference checking device detects interference, the interference checking device delivers an axis stop signal the movable part.

5 Claims, 5 Drawing Sheets

NUMERICAL CONTROLLER

BACKGROUND OF THE INVENTION

1. Field of the Invention

The present invention relates to a numerical controller having a function to previously store the respective contours of movable parts, such as a tool, workpiece, etc., and stationary parts of a machine and perform interference check based on the stored contour models.

2. Description of the Related Art

In a machine tool or the like that is controlled by a numerical controller, movable parts (control axes) of the machine are drivingly controlled by the numerical controller based on a previously created NC program, and a workpiece or the like to be machined is machined. If the NC program is erroneous or if the workpiece is wrongly mounted in the machine, the machine movable parts may possibly interfere with some other object(s). For example, a tool may run against the workpiece or a jig or the like for mounting the workpiece during operation of the machine.

Conventionally known is an apparatus that is configured to generate an alarm when it foresees such interference.

According to a known invention (see JP 2895316B), for example, the respective shapes of a workpiece, a tool, and a machine, including its interference check points, are set in advance, a motion command is read from a program, and they are used in checking the workpiece to see if it interferes with the tool or the machine.

Another known invention (see JP 2005-92654A) comprises an interference monitoring preparation device and an interference monitoring device. Contour interference determining means that is attached to these devices divides the range of product contours into categories, based on the respective contours of products to be machined and a tool used, and checks the contours of the tool and a machine for interference for each category.

In order to stop the action of a machine before a movable part (control axis) of a tool or the like interferes with some other object such as a workpiece during operation of the machine, whether or not interference is caused must be determined before the movable part is moved to a position where the interference occurs. This decision must be made fully ahead of the occurrence of the interference.

Before a motion amount based on a move block command from the NC program is outputted to a motor for driving the movable part, whether or not interference will occur is determined according to the position of the movable part based on the motion command, in analyzing the move block command and creating execution data. If it is concluded that interference will occur, an alarm is issued or an interlocked state is established without the output of the motion command to the servomotor for driving the movable part. The occurrence of interference can be avoided by stopping the operation of the machine in this manner.

The interference check takes time. Since the movable part is checked for interference with some other object, moreover, the check requires a very large amount of calculation. In some cases, therefore, a dedicated apparatus for interference check may be attached to the numerical controller. In these cases, communication between the body of the numerical controller and the interference checking device takes time. The operation of the machine is stopped if the numerical controller foresees the occurrence of interference after the interference checking device performs the interference check and delivers the result of the check to the numerical controller body. In doing this, a position for the movement of the movable part must be forecast based on the sum of at least a time required for interference check and the time for communication between the numerical controller body and the interference checking device. If the sum of the time required for interference check and the communication time is T, for example, a position of the movable part after the passage of the time T since the present time is determined to see if interference will occur. In order to stop operation in case of interference, it is necessary only that interference check be performed based on a pre-read command position after the passage of the time T since the present time. Since stopping the operation requires a deceleration time, however, interference check should be made in a motion command position for preceding time corresponding to the deceleration time.

The interference check should be performed at time intervals as short as possible. If the time intervals of the interference check are too long, interference having occurred once may possibly be canceled afterward in a position corresponding to the timing for the interference check. Therefore, the interference check period should be minimized. If the time required before the position used for the interference check is reached is shorter than a time required for interference check processing, however, a situation may occur such that interference is already caused by the time when it is concluded by the interference check processing that the interference will occur. Thus, the time before the position used for the interference check is reached should neither be too much shorter nor be too much longer than the time required for the interference check processing.

In using the numerical controller to control a mechanism in which movable parts that belong to different systems or machines work in one work space, in particular, the check period for interference between the two or more movable parts should be as short as possible.

Since the movable parts are movable, however, the state of interference between the movable parts and other objects changes, so that the interference check processing time fluctuates. In the case of the mechanism in which the movable parts that belong to the different systems or machines work in the one work space, as described above, in particular, the time required for interference check fluctuates considerably. For example, the time required for interference check when a movable part of one system is stopped varies substantially from the time required when the movable parts of both systems are moving. If the execution period for interference check is fixed based on the maximum required time for interference check, a problem is inevitably caused such that the occurrence of interference, if any, cannot be detected, as mentioned before.

SUMMARY OF THE INVENTION

The present invention provides a numerical controller capable of foreseeing an occurrence of interference during operation of a machine and securely preventing the interference.

A numerical controller of the present invention drivingly controls a movable part of a machine according to commands in a program, and has an interference checking device for repeatedly executing interference check processing for determining an interference between the movable part and other objects, so that motion of the movable part is decelerated to be stopped when the interference is determined in advance by the interference checking device. The numerical controller comprising: pre-reading means for pre-reading the program to be converted into execution data; advanced time determining means for determining advanced time for the next interference check processing based on a time period spent in the preceding interference check processing by the interference checking device and time of termination of the preceding interference check processing; advanced position calculating means for calculating an advanced position of the movable part predicted at the advanced time determined by the advanced time determining means, using a commanded position of the movable part at the time of termination of the interference check processing and the execution data obtained by the pre-reading means; and output means for outputting the advanced position calculated by the advanced position calculating means to the interference checking device, so that the next interference check processing is performed for determining an interference between the movable part and other objects at the advanced position.

The advanced time determining means may determine an advanced time period from the time of termination of the preceding interference check processing by adding the time period spent in the preceding interference check processing to a product of a time period required for communication with the interference checking device, a time period required for decelerating the movable part to be stopped, and a margin time.

The advanced position calculating means may calculate the advanced position using a commanded speed and a commanded speed override by the program.

The machine may have a plurality of systems to be controlled according to respective programs. In this case, the pre-reading means pre-reads the respective programs to be converted into execution data, the advanced position calculating means calculates advanced positions of movable parts of the plurality of systems predicted at the advanced time determined by the advanced time determining means, and the output means outputs the calculated advanced positions of the movable parts to the interference checking device.

Since interference check timing and the position of the movable part are determined for interference check in accordance with the time required for the interference check, the occurrence of interference can be securely prevented without delay or advance.

DETAILED DESCRIPTION

Figure 1:
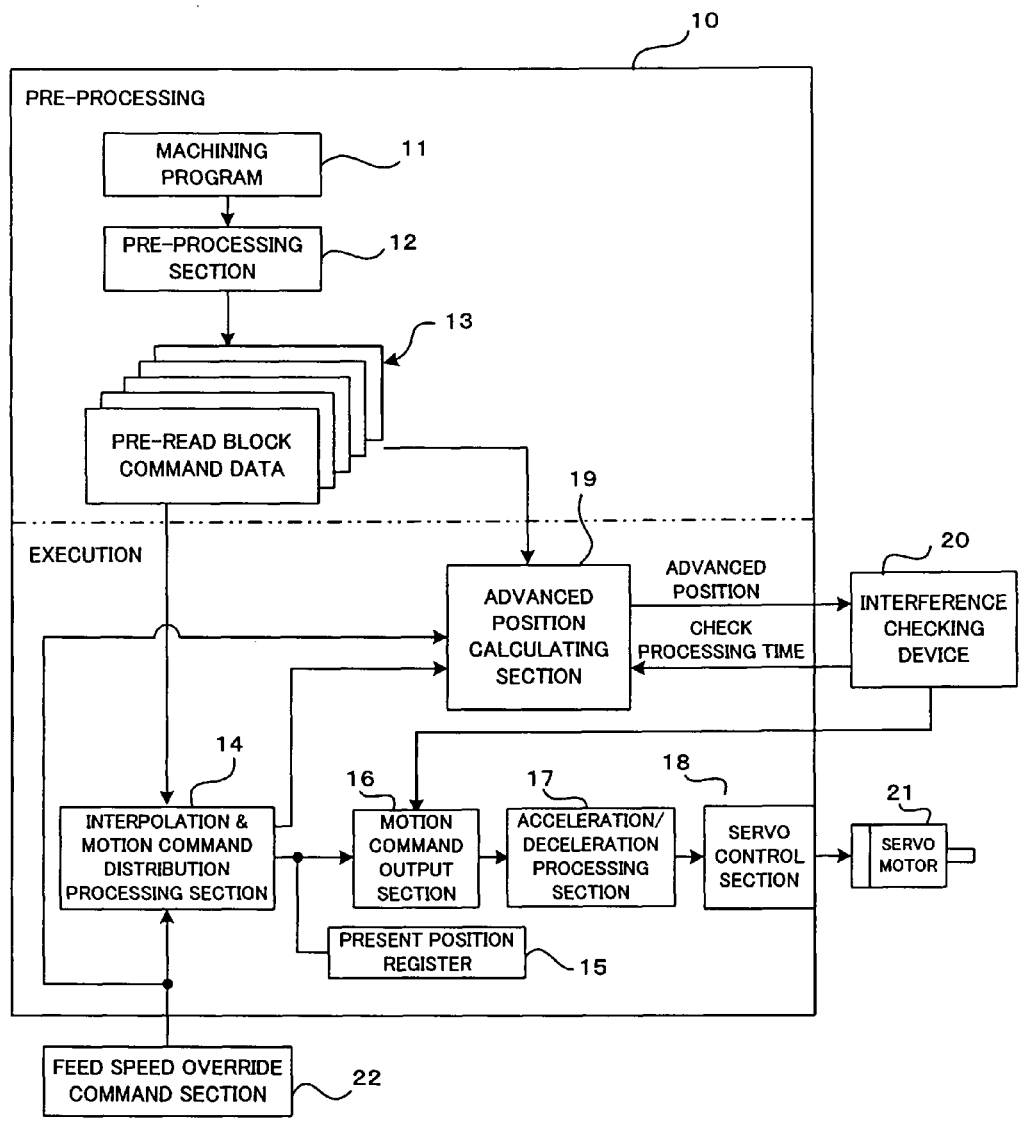
FIG. 1 is a functional block diagram of a numerical controller according to one embodiment of the present invention.

FIG. 1 is a functional block diagram of a numerical controller according to one embodiment of the present invention.

A numerical controller 10 is divided into sections for pre-processing and execution. In pre-processing, a pre-processing section 12 for pre-processing reads a command from a machining program 11 with every block, converts it into execute-form data, creates pre-read block command data 13, and loads it into a register or the like.

In an interpolation and motion command distribution processing section 14 for execution processing, the pre-read block command data 13 is read out with every block, and a present coordinate position (hereinafter referred to as the present position) is updated by determining a distributed motion amount for each axis movable part (servomotor for each axis) with every distribution period, based on each axis motion amount commanded in the block, a speed, and an override value (%) from a feed speed override command section 22, and adding the distributed motion amount to a present position register 15. Further, an output is delivered to an acceleration/deceleration processing section 17 through a motion command output section 16. When an axis stop command is inputted from an interference checking device 20, as mentioned later, the motion command output section 16 stops the delivery of the distributed motion amount of a motion command outputted from the motion command distribution processing section 14 to the acceleration/deceleration processing section 17. Unless the axis stop command is inputted from the interference checking device 20, the motion command is outputted to the acceleration/deceleration processing section 17.

On receipt of the motion command, the acceleration/deceleration processing section 17 performs acceleration/deceleration processing and outputs the motion command for the acceleration/deceleration-processed motion amount to a servo control section 18 for controlling a servomotor 21. The servo control section 18 performs position and speed feedback control based on this motion command and position and speed feedbacks from a position/speed detector, which is attached to the servomotor 21 (or a movable part driven by this servomotor), and current feedback control based on a current feedback from a current detector for detecting driving current. The servo control section 18 drivingly controls the servomotor 21 through an amplifier. Although FIG. 1 shows the only one servomotor 21, similar control is performed for servomotors for individual axes (movable parts) of a machine tool, and the movable parts are subjected to position and speed control.

The configuration of the numerical controller 10 described above is a conventional one. The numerical controller 10 of the present embodiment differs from a conventional numerical controller in that it further has therein an advanced position calculating section 19 for calculating an advanced position for advanced time and is additionally provided with the interference checking device 20.

The advanced position calculating section 19 calculates an advanced position at advanced time (in future) at which an interference between a machine movable part, such as a tool, and some other object can be avoided based on the pre-read block command data 13 and the override value (%) from the feed speed override command section 22. The advanced time should be set so that the interference can be avoided by detecting the interference and outputting an axis stop signal to the motion command output section 16, thereby stopping the motion command for the acceleration/deceleration processing section 17.

Further, the interference checking device 20 is composed of an information processing apparatus, such as a personal computer. It may be connected through a communication line. The interference checking device 20 serves to store the respective contours of a tool, workpiece, machine, etc. and check to see if any interference will occur between the tool and any other object, based on a position of the movable part delivered from the advanced position calculating section 19.

Since a method and processing for interference check by the interference checking device 20 are conventional, a description thereof is omitted. The interference checking device 20 of this embodiment, however, differs from the conventional one in that the time required for the interference check is fed back to the advanced position calculating section 19 and that the axis stop signal is outputted to the motion command output section 16 when it is concluded that interference will occur.

An advanced time period to determine the advanced position in the advanced position calculating section 19 is obtained by adding a predetermined margin $\alpha$ to the sum (T1+T2+T3) of a time T1 required for the interference check processing by the interference checking device 20, a time T2 required for communication between the advanced position calculating section 19 and the interference checking device 20, and a time T3 required for decelerating and stopping the movable part in motion. The time T2 for the communication between the advanced position calculating section 19 and the interference checking device 20 is a constant measurable value that hardly fluctuates after this system configuration is settled. The required time T3 for deceleration stop is a constant value that is settled depending on the configuration of the acceleration/deceleration processing section 17. On the other hand, the required time T1 for the interference check processing by the interference checking device 20 varies depending on the position of the movable part. In the case where axes that belong to different systems or machines are controlled and caused to work in a common work space, in particular, as mentioned before, there exist a plurality of movable parts, so that the required time T1 for the interference check varies depending on the respective operating positions of the movable parts.

In the present embodiment, therefore, the time used for the interference check executed last by the interference checking device 20 is fed back to the advanced position calculating section 19, and this time is regarded as the required time T1 for the interference check. The position of the movable part subjected to the last interference check and the position of the interference check to be subjected to the next interference check are close to each other, and the time required for the next interference check can be estimated to be equal to the foregoing time. Therefore, the time used for the last interference check is set as the required time T1 for the next interference check. The required time T1 for the interference check may be an average of times used for the last several interference checks (past several checks, including the last check, last but one, last but two . . . ), which can be obtained by means of the interference checking device 20 or the advanced position calculating section 19.

Figure 2:
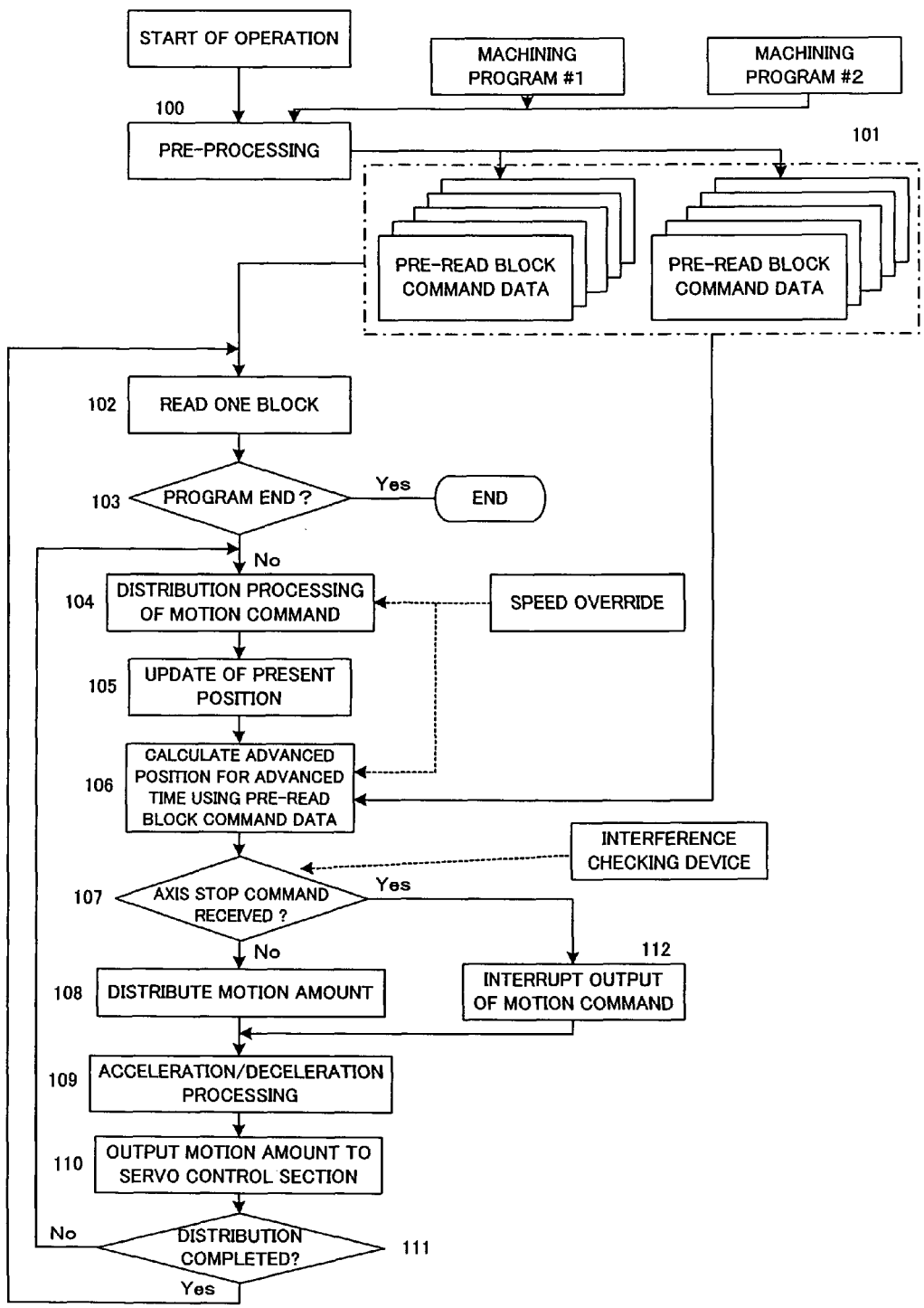
FIG. 2 is a flowchart showing an algorithm of processing performed by the numerical controller according to the embodiment.

FIG. 2 is a flowchart showing an algorithm of processing performed by the numerical controller according to the present embodiment.

In the example shown in FIG. 2, the numerical controller is configured to control two systems.

When operation is started, machining programs 1 and 2 for the individual systems are read out, and the processing of Step 100 and the subsequent steps is performed for each machining program. First, pre-processing (Step 100) is executed to create execution data, and the data is stored as pre-read block command data (Step 101).

Based on the pre-read block command data, execution processing is performed to distribute motion commands for the individual axes. First, the pre-read block command data for one leading block is read (Step 102). If the read command is not a program end command (Step 103), motion command distribution processing of Step 104 is executed. Although any other commands than motion commands are also executed, this execution is not directly related to the present invention. In FIG. 2, therefore, processing for those other commands is not shown, and only processing for movement commands is illustrated.

In the motion command distribution processing of Step 104, a distributed motion amount for each axis is determined with every distribution period, based on a position (motion amount) commanded in the read block and a speed override value commanded by the feed speed override command section 22. The distributed motion amount obtained in this manner is added to the present position register, whereupon the present position is updated (Step 105).

Then, processing for calculating and outputting a position (command position) after the advanced time period for interference check to the interference checking device 20 is performed based on the pre-read block command data (processing of the advanced position calculating section 19 shown in FIG. 1). This processing has no direct connection with the motion command distribution processing for each axis. Since the position after the advanced time period is calculated and outputted to the interference checking device 20 with every motion command distribution period, however, the processing concerned is described together with the processing for motion command distribution. This processing of Step 106 will be described in detail later.

Then, it is determined whether or not an axis stop command is inputted from the interference checking device 20 (Step 107). If the command is not inputted, the distributed motion amount obtained in Step 104 is outputted, and acceleration/deceleration processing is performed (Steps 108 and 109). Thereafter, a motion amount subjected to the acceleration/deceleration processing is outputted to the servo control section 18 (Step 110). It is then determined whether or not distribution of the motion command for the read block is completed. If the distribution is not completed, the procedure returns to Step 104. The processing of Steps 104 to 111 is repeatedly executed with every distribution period. If it is concluded that the motion command distribution is completed, on the other hand, the procedure returns from Step 111 to Step 102, whereupon the aforementioned processing of Step 102 and the subsequent steps is executed with every distribution period.

If it is concluded in Step 107 that the axis stop signal is inputted from the interference checking device 20, the output of the motion command is interrupted, and an alarm is outputted or an interlocked state is established (Step 112). Then, the acceleration/deceleration processing is performed (Step 109) and its result is outputted to the servo control section 18. Since the motion command input is "0" in the acceleration/deceleration processing, deceleration stop processing is performed so that the motion command is "0", based on the motion amount then remaining in the acceleration/deceleration processing section.

Figure 3:
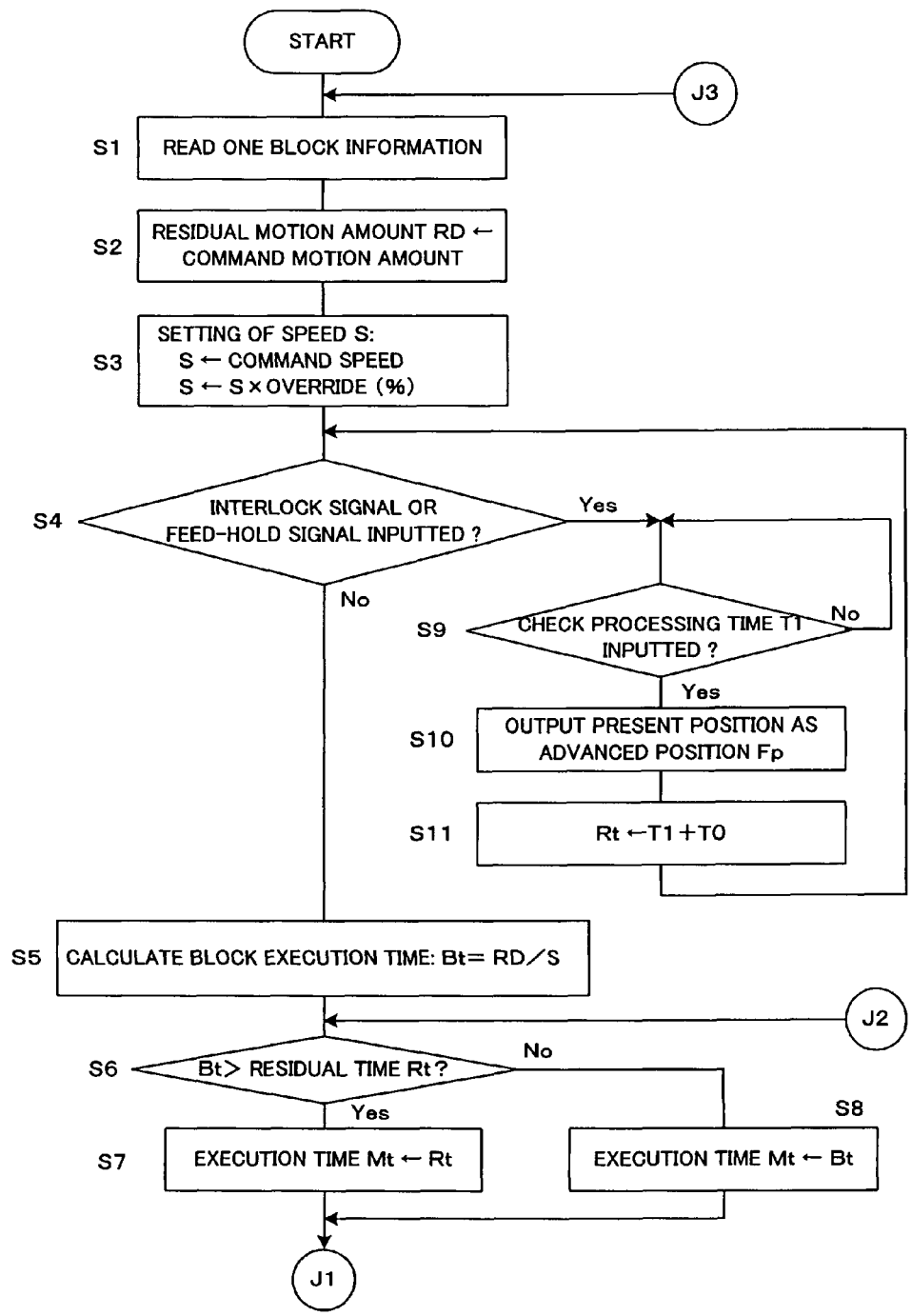
FIG. 3 is a flowchart showing an algorithm of processing for calculating an advanced position predicted at advanced time for interference check and outputting the calculated position to an interference checking device according to the embodiment.
Figure 4:
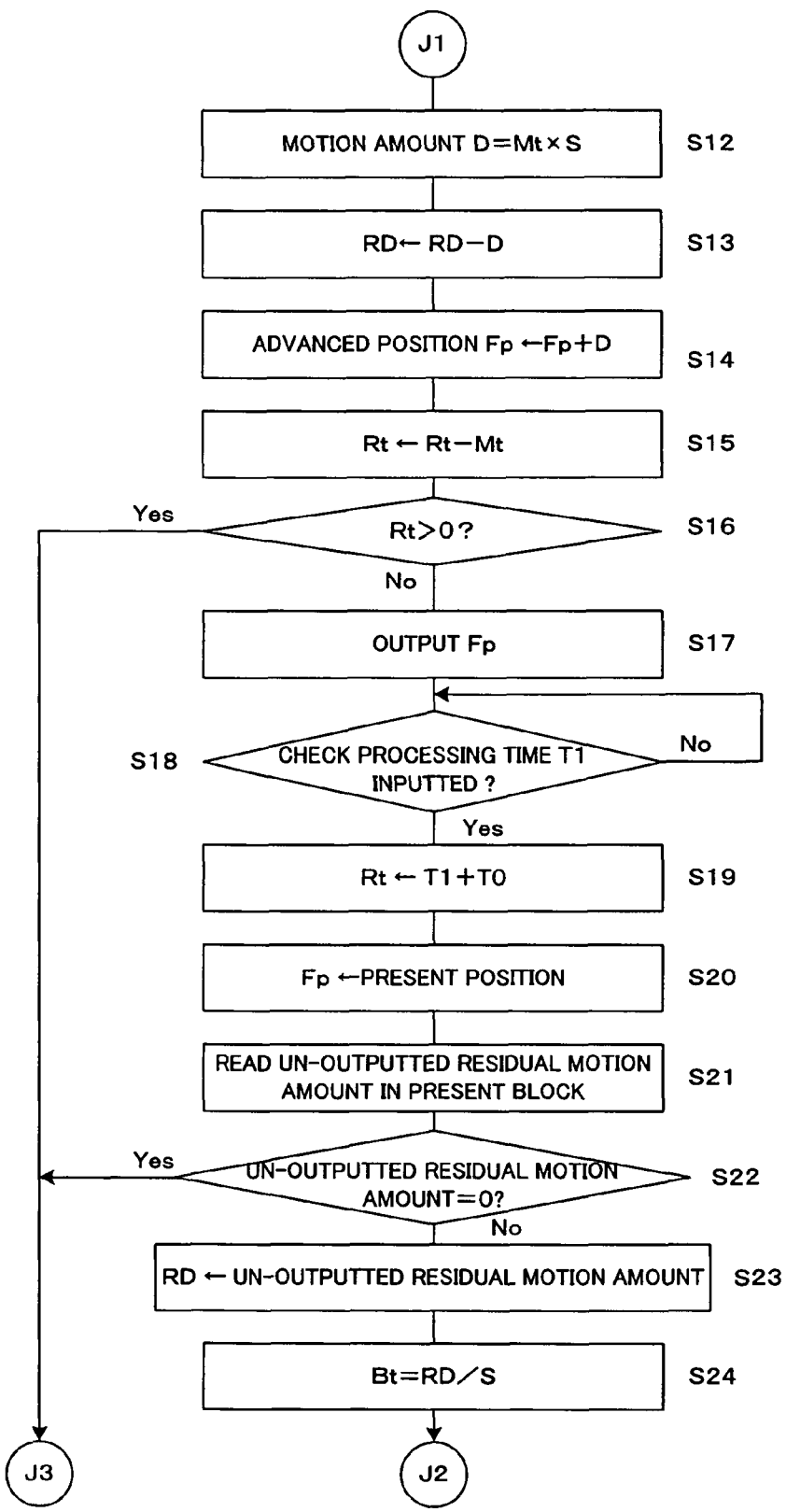
FIG. 4 is a continuation of the flowchart of FIG. 3.
Figure 5:
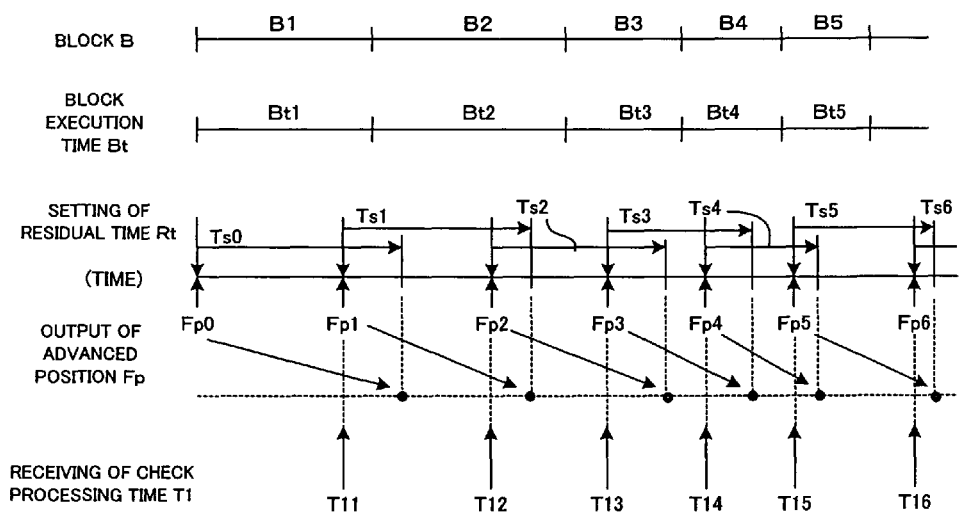
FIG. 5 is a diagram illustrating output timing for the advanced position to be outputted to the interference checking device according to the embodiment.

FIGS. 3 and 4 are flowcharts showing an algorithm of the processing of Step 106 for calculating a position (advanced position) after the advanced time period for the interference check by the interference checking device 20 and outputting the calculated position to the interference checking device. Further, FIG. 5 is a diagram illustrating output timing for the advanced position to be outputted to the interference checking device. Processing for outputting the advanced position will now be described with reference to the diagram of FIG. 5.

In FIG. 5, B1, B2, B3, . . . of "execution block B" designate orders of blocks to be executed, Bt1, Bt2, Bt3, . . . of "block execution time Bt" represent movement execution times based on motion commands for the blocks B1, B2, B3, . . . , and Ts0, Ts1, Ts2, . . . of "setting of residual time Rt" represent the advanced time periods for interference check. Fp0, Fp1, Fp2, . . . of "output of advanced position Fp" represent outputs of the advanced position Fp, and T11, T12, T13, . . . of "reception of check processing time T1" designate the time used for interference check processing executed last by the interference checking device 20 and received by the interference checking device.

When a machining program execution start command is inputted, the numerical controller 10 initially sets the present position in a register for storing the advanced position Fp for interference check, sets "0" in a register for storing the advanced time period Ft, and sets an initial value as the residual time Rt in a register. As described later, the time to be set as the residual time Rt in the register is the sum (T1+T2+T3+β) of the required time T1 for the interference check processing by the interference checking device 20, the required time T2 for communication between the advanced position calculating section 19 and the interference checking device 20, the required time T3 to deceleration stop, and the predetermined float α. The value (T2+T3+α) is an unchangeable or fixed value that can be settled depending on the system configuration. If this value is T0, the residual time Rt is set to be Ts=T1+T0. Since the required time T1 for the interference check processing is initially unknown, however, a value Ts0 (=T1'+T0) based on an internal value T1' for the check processing time with allowance is set as an initial value.

Thereupon, the pre-read block command data is read out (Step S1), and a motion amount commanded in the block is loaded into a register to be utilized as a residual motion amount RD for the calculation of the advanced position (Step S2).

Then, a speed S is determined (Step S3) based on a speed S commanded for the motion command for the block concerned and the override value commanded by the feed speed override command section. It is determined whether or not an interlock signal or a feed-hold signal is inputted (Step S4). If the signal is not inputted, the residual motion amount RD to be stored in a register for advanced position calculation is divided by the speed S to determine the block execution time Bt (Step S5).

The block execution time Bt and the residual time Rt (initially set at Ts0) to be stored in the register are compared (Step S6). If the residual time Rt is shorter, an execution time Mt is set as the residual time Rt (Step S7). If the block execution time Bt is not longer than the residual time Rt, on the other hand, the execution time Mt is set as the block execution time Bt (Step S8).

Then, a motion amount D is obtained by multiplying the execution time Mt by the speed S (Step S 12), and the residual motion amount RD is updated by subtracting the motion amount D from the register for storing the residual motion amount RD (Step S13). Further, the advanced position Fp (initially set as the present position) is updated by adding the motion command D to the register for storing the advanced position Fp (Step S14). Furthermore, the residual time Rt (initially set at Ts0) is updated by subtracting the execution time Mt from the register for storing the residual time Rt (Step S15).

It is determined whether or not the updated residual time is larger than "0" (Step S16). If Mt=Rt is set in Step S7, the residual time Rt in the processing of Step S15 is "0", so that the procedure advances from Step S16 to Step S17. If it is concluded in Step S8 that the block execution time Bt is shorter than the residual time Rt and that Mt=Bt is set, the decision in Step S16 is Rt>0. In this case, the procedure returns from Step S16 to Step S1.

In the example shown in FIG. 5, the block execution time Bt1 for the first block B1 is smaller than the initial value Ts0 of the residual time Rt, so that Mt=Bt is confirmed in Step S8. Since a positive value is obtained in Step S15 when the execution time Mt is subtracted from the residual time Rt (=Ts0), the procedure advances from Step S16 to Step S1. Thereupon, a command for the next block B2 is read out, and the execution time Bt (Bt2) for the next block is determined in the processing of Step S5. In the example shown in FIG. 5, the residual time Rt is shorter than the block execution time Bt (=Bt2), so that it is set as the execution time Mt in Step S7. Since the residual time Rt is "0" after the processing of Steps S12 to S16 is performed, the procedure proceeds from Step S16 to Step S17, whereupon the advanced position Fp (=Fp0) obtained in Step S14 is outputted.

Since the advanced time period Ts (=T1+T0) is set as the residual time Rt, the advanced position Fp attained when the residual time Rt from which the time required for the movement based on each block command is subtracted is "0" represents the position of the movable part at the advanced time, and the processing of Steps S5 to S16 constitutes advanced position calculating means.

Then, the processor waits for an interference check processing time T1 sent from the interference checking device 20 (Step S18). A signal for the return of the interference check processing time T1 also represents an interference check end signal. If the check processing time T1 is returned at the timing T11, in the example shown in FIG. 5, the sum Ts1 (=T1+T0) of the returned check processing time T1 and the fixed value T0 is loaded as the residual time Rt into the register (Step S19). This residual time Rt represents the advanced time period, and the processing of Step S19 corresponds to the advanced time calculating means.

Further, the present position to be stored in the present position register 15 is loaded into the register for storing the advanced position Fp (Step S20), an un-outputted residual motion amount for the block stored in the interpolation and motion command distribution processing section 14 is read (Step S21), and it is determined whether or not the un-outputted residual motion amount is "0" (Step S22). If the amount is "0", the procedure proceeds to Step S1. If the check processing time T1 (=T11) is returned before the movement processing for the first block B1 terminates, as in the example shown in FIG. 5, the un-outputted residual motion amount is not "0", so that it is set in the register for storing the residual motion amount RD (Step S23). A predicted time required for the residual motion amount RD is obtained as the execution time Bt for the block (B1) by dividing the residual motion amount RD by the speed S (Step S24), whereupon the procedure proceeds to Step S6. Thereafter, the advanced position Fp or the position attained when the residual time Rt is "0", which indicates the passage of the residual time (T1+T0) set in Step S19 after the present time, is obtained, as mentioned before, whereupon the advanced position Fp is outputted to the interference checking device 20 (Step S17). Thus, the interference checking device 20 is caused to perform interference check.

In the example shown in FIG. 5, the check processing time T1 is received at the timing T11, (T1+T0=Ts1) is set as the residual time Rt, and the procedure proceeds to Step S20 so that the advanced position Fp1 or the position attained when the residual time Rt is "0", which indicates the passage of the time set in Step S19, is obtained and outputted in Step S17. Then, it is expected that the check processing time will be returned from the interference checking device 20.

Thereafter, the above-described processing is executed repeatedly. More specifically, when the check processing time T1 is returned from the interference checking device 20, the advanced position Fp or an expected position indicative of the passage of the time (T1+T0) for the next interference check is outputted to the interference checking device 20, based on the check processing time T1, and it is expected that the check processing time T1 will be returned from the interference checking device 20. In consequence, a scheduled time (future time) for interference check is settled in accordance with the time required for the interference check processing by the interference checking device 20. The advanced position (expected position) at this time is obtained and delivered to the interference checking device, whereupon the interference checking device performs interference check to see if the advanced position (expected position) interferes with any object. Thus, the period (timing) for interference check cannot be shorter or much longer than the interference check processing time of the interference checking device, so that an optimum interference check can be made in accordance with the interference check processing time.

Even if a position attained in a time period shorter than the time required for the interference check processing by the interference checking device 20 is delivered to the interference checking device to make the interference check, as mentioned before, interference is already caused by the time when it is concluded by the interference check processing that the interference will occur. Therefore, the previous interference check loses its significance. If a position attained in a time period much longer than the time required for the interference check is delivered to the interference checking device 20 to make the interference check, moreover, the interference check may possibly be made in a position attained after interference having occurred once is canceled. Accordingly, the reliability of the interference check is lowered. According to the present embodiment, however, the time for the interference check processing never substantially changes despite the variation of the time required for the interference check, as mentioned before. Thus, the interference check can be executed more efficiently and securely by checking to see if any interference will occur in the expected position at the time settled for the interference check concerned.

If an interlock signal or a feed-hold signal is inputted (Step S4), the operation of the machine is stopped. In the case where the controlled machine has a plurality of systems or when different machines are operating in a common work space, however, some other systems or machines may possibly move and undergo interference. If the interlock or feed-hold signal is inputted, therefore, the processing of Steps S9 to S11 is carried out. More specifically, it is determined whether or not the check processing time T1 is returned from the interference checking device 20 (Step S9). When the check processing time T1 is returned, the present position is outputted as the advanced position Fp for interference check to the interference checking device 20 (Step S10), and the sum of the fixed value T0 and the received interference check processing time T1 is set as the residual time Rt (Step S11), whereupon the procedure returns to Step S4. If an interlock or feed-hold signal is inputted, thereafter, this processing is executed repeatedly.

Although the numerical controller for mainly controlling the machine tool has been described herein in connection with the present embodiment, the present invention is also applicable to robots or any other industrial machines than the machine tool.

What is claimed is:

1. A numerical controller for drivingly controlling a movable part of a machine according to commands in a program, while using an interference checking device to repeatedly execute interference check processing on the program to determine an interference between the movable part and other objects, so that motion of the movable part is decelerated to be stopped when the interference is determined in advance by the interference checking device, said numerical controller comprising:
    pre-reading means for pre-reading the program to be converted into execution data;
    advanced time determining means for determining a future time to execute the next interference check processing based on a time period spent in the preceding interference check processing by the interference checking device and a time of termination of the preceding interference check processing;
    advanced position calculating means for calculating an advanced position of the movable part predicted at the future time determined by said advanced time determining means, using a commanded position of the movable part at the time of termination of the interference check processing and the execution data obtained by said pre-reading means; and
    output means for outputting the advanced position calculated by said advanced position calculating means to the interference checking device, so that the next interference check processing is performed for determining an interference between the movable part and other objects at the advanced position.

2. A numerical controller according to claim 1, wherein said advanced time determining means determines a future time period from the time of termination of the preceding interference check processing by adding the time period spent in the preceding interference check processing to a product of a time period required for communication with the interference checking device, a time period required for decelerating the movable part to be stopped, and a margin time.

3. A numerical controller according to claim 1, wherein said advanced position calculating means calculates the advanced position using a commanded speed and a commanded speed override by the program.

4. A numerical controller according to claim 1, wherein the machine has a plurality of systems to be controlled according to respective programs, said pre-reading means pre-reads the respective programs to be converted into execution data, said advanced position calculating means calculates advanced positions of movable parts of the plurality of systems predicted at the future time determined by said advanced time determining means, and said output means outputs the calculated advanced positions of the movable parts to the interference checking device.

5. A method, comprising:
    determining interference of a movable part in a machine while the movable part is moving by a computer, the determining executed at a time prior to interference responsive to a first time to execute a test for interference in the machine based on a position of the movable part, a second time to move any interfering movable parts in the machine and a third time of an end of a previous test for interference in the machine.

\* \* \* \* \*